July 7, 1931.  E. KERN  1,813,056

COMMUTATION OF CONTINUOUS CURRENT

Filed Oct. 15, 1928  5 Sheets-Sheet 1

Inventor
Erwin Kern
By Marks Clerk
Attorneys

July 7, 1931. E. KERN 1,813,056
COMMUTATION OF CONTINUOUS CURRENT
Filed Oct. 15, 1928 5 Sheets-Sheet 2

Inventor
Erwin Kern
By
Attorneys

July 7, 1931.  E. KERN  1,813,056
COMMUTATION OF CONTINUOUS CURRENT
Filed Oct. 15, 1928   5 Sheets-Sheet 3

Inventor
Erwin Kern
By Marks & Clark
Attorneys

July 7, 1931.　　　　　E. KERN　　　　　1,813,056

COMMUTATION OF CONTINUOUS CURRENT

Filed Oct. 15, 1928　　　5 Sheets-Sheet 4

Inventor
Erwin Kern
By Marks & Clerk
Attorneys

July 7, 1931.  E. KERN  1,813,056

COMMUTATION OF CONTINUOUS CURRENT

Filed Oct. 15, 1928  5 Sheets-Sheet 5

Inventor
Erwin Kern
By *Marks Clerk*
Attorneys

Patented July 7, 1931

1,813,056

UNITED STATES PATENT OFFICE

ERWIN KERN, OF WETTINGEN, SWITZERLAND, ASSIGNOR TO AKTIENGESELLSCHAFT BROWN, BOVERI AND CIE., OF BADEN, SWITZERLAND

COMMUTATION OF CONTINUOUS CURRENT

Application filed October 15, 1928, Serial No. 312,649, and in Germany October 15, 1927.

This invention relates to improvements in devices for commutating direct current in which the operating voltage will not be limited by the voltage of each segment of the usual type of commutator and, therefore, by the number of segments available.

It is well-known that the operating voltage of direct current motors is limited by the segment voltage and the number of segments of the commutator in consequence of the well-known difficulties of commutation. It is possible to overcome such difficulties of commutation by replacing the mechanical commutation structure of the motor by a device using a commutating process such as takes place in an electric valve of, for example, the mercury vapor type. With the use of electronic electric valves, the characteristic of which is the restriction to one direction of the current flow therethrough, the current may be periodically cut off in the valves, as desired, by proper control of the grids thereby permitting the substitution of an electronic device for the mechanical devices heretofore used for commutation purposes. Such electronic commutation may be obtained by dividing the armature winding into a number of portions, and connecting the different connection points of the several armature winding portions through valves or devices in which current-rectifying arcs are provided to the direct current supply line. In a direct current motor, having electric valve commutation, the neutral line of the armature may be displaced as desired, provided the field current strength impressed on the armature is sufficient to produce a reversal of current. The use of the usual controlled electron discharge tube for commutation purposes is possible without any material difficulties, but such tubes are impractical for many reasons, inherent in the tube structure itself, chief of which is the limitation to small quantities of energy which may pass therethrough. In other words, the usual electron discharge tube is capable of handling only such small currents as would be impractical for the commutation of direct current motors of any practical size. Such controlled electron discharge tubes may be replaced by mercury vapor rectifiers, or by hot cathode gas or vapor-filled rectifiers which are capable of carrying current of many times the amount possible of transmission through electron tubes. The difficulty with the use of metallic vapor arcs is, however, that once ignited, the arc cannot be readily extinguished again by connecting a negative voltage to the grid controlling anode from which the arc flows to the cathode. Such negative voltage can be successfully used only to prevent ignition of the arc and the consequent formation of the arc to the cathode. It is, therefore, necessary to interrupt the current in the circuit by other means, such as the introduction of alternating current voltages of suitable magnitude, after which passage of current can be prevented by maintaining the grid at negative potential with respect to the cathode.

To commutate current in the armature of a direct current motor, as contemplated by the present invention, the source of direct current is connected to at least two points of the armature through electric valves and, after a certain period of time, is automatically connected to at least two different points of the armature through another set of valves. The current is then extinguished in the circuit connected with the first two points by making the grids of the valves connected therewith negative and thereupon impressing on the circuit, including the valve, an alternating voltage of such magnitude as to interrupt the current in the circuit. The alternating current will be of an amplitude designed in correspondence with that portion of the direct current in the conductors leading into the armature through the valves and leading out of the armature through the valves. The result of the above action is that the portion of the direct current in each conductor leading to the armature passes through zero periodically while the current flowing through the armature is not affected by the superimposed alternating current. Such periodic passage of the current through zero permits control of a mercury vapor arc by means of a grid with the aid of the auxiliary construction to be hereinafter described, whereby the current, through the valve, is periodically interrupted and the direct current is, therefore, commutated.

It is, therefore, among the objects of the present invention to provide a device for commutating direct current without regard to the number of segments composing the usual type of commutator and without regard to the voltage of the several segments, as was the case heretofore.

Another object of the present invention is to provide a device for commutating direct current, which device will employ electric valves and auxiliary apparatus to obtain the desired results.

Another object of the invention is to provide a device for commutating direct current in which metallic vapor arc devices, or hot cathode gas or vapor-filled devices, are used and in which the current flowing through such arc devices is controlled to permit periodic interruption of the current.

Another object of the invention is to provide a device for commutating direct current in which the source of direct current is connected to the armature winding of a direct current motor and an alternating current is superimposed on the direct current supplied to the armature winding by means causing the direct current in each section of the winding to pass periodically through zero.

Objects and advantages, other than those above set forth, will be apparent from the following description when read in connection with the accompanying drawings in which Figure 1 diagrammatically illustrates an embodiment of the present invention in which the armature winding of a direct current motor, divided into four winding portions, is shown connected to a direct current source through controlled electric valves and valve grid control devices, whereby the current is caused to pass periodically through zero, thereby permitting commutation of the direct current supplied to the armature winding;

Fig. 2 is a diagram of the portions of Fig. 1 necessary to illustrate the circuit energized to secure control of one set of electric valves during one portion of a constantly recurring cycle of operations;

Fig. 3 diagrammatically illustrates a modification of the invention which differs from the embodiment shown in Fig. 1, in that the grids of one valve of each pair are controlled over a separate commutator, allowing current to flow into the armature windings, which commutator is connected in potentiometer arrangement.

Figure 1:
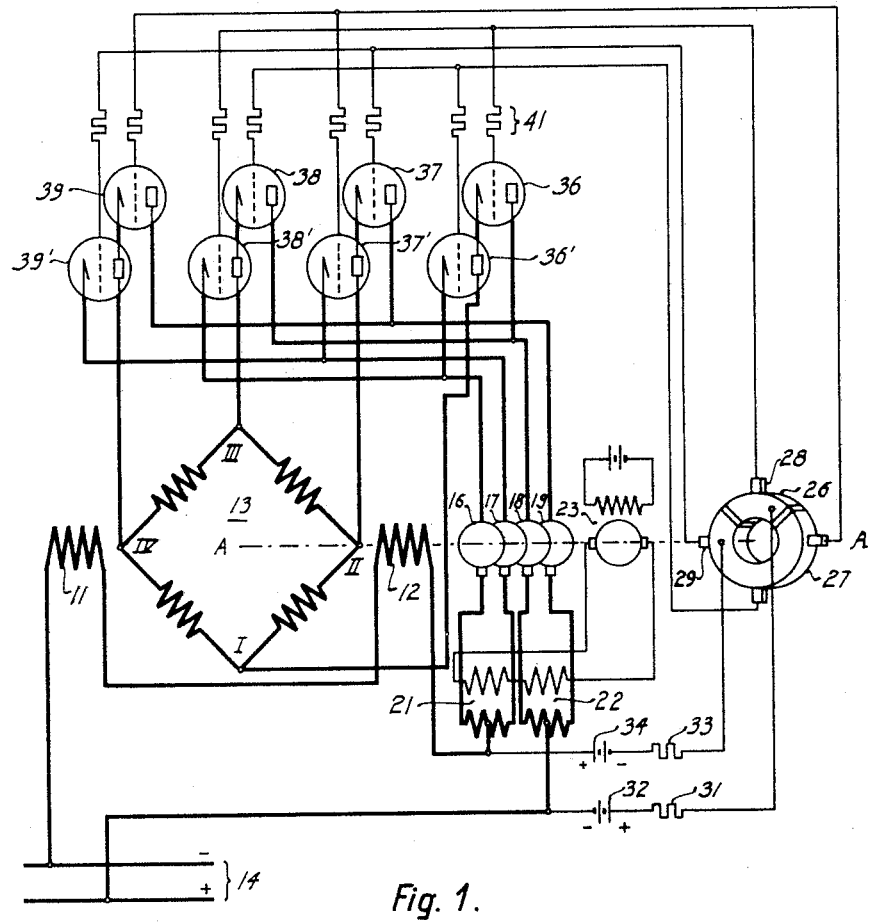

Referring more particularly to the drawings by characters of reference, the reference numerals 11 and 12 designate the several portions of a stationary field winding, and the reference numeral 13 designates a rotating armature of a direct current motor which is supplied with current from a source 14. The armature winding 13 is shown as divided into only four sections for purposes of facilitating understanding, although it will be apparent of the invention that it may be divided into any number of sections, which sections are connected at points I, II, III and IV. It is also evident that the motor may be constructed with a fixed armature and a rotating field, as may be desired, the portions of the structures to be hereinafter described being correspondingly movable or stationary for the purpose of maintaining the proper mechanical relations therebetween.

A plurality of slip rings 16, 17, 18 and 19 are mounted on the shaft of the motor indicated by the line A—A and are connected, through brushes, with the secondary windings of transformers 21 and 22, the primary windings of which are connected with and supplied with alternating current of suitable frequency from an alternator 23, also mounted on the shaft A—A of the motor. The primary windings of the transformers 21 and 22 are connected in series to obtain equality of the alternating current amplitudes. A commutator, divided into two segments 26 and 27, is mounted adjacent the motor shaft in such position as to permit rotation of brushes, indicated at 28 and 29, by the motor shaft on the commutator. The commutator segment 26 is connected through a resistance 31 with the positive side of a battery 32, and through the secondary winding of the transformer 22 with the slip rings 18 and 19; the segment 27 is connected through a resistance 33 with a battery 34 through the secondary winding of the transformer 21 with the slip rings 16 and 17, and the slip rings are connected with a plurality of electric valves 36, 37, 38 and 39 controlled by grids which are connected through resistances 41 with the brushes 28, 29, etc., rotating on the commutator 26, 27.

It will be seen that each of the armature winding connection points is connected with one pair of valves which are so connected that one valve of each pair functions to allow current to flow only into the armature, and the other valve of the pair of valves functions to allow current to flow only out of the armature winding. For convenience, the power circuits have been shown in heavy lines through the drawing, and the valve grid control circuits have been shown by lighter lines.

In operation, when the armature 13 rotates in such manner as to move point II to the position shown in the drawing by point I, the device passes through a constantly recurring cycle of operation, to be now particularly described, with relation to each point as it moves from the position shown for that point to the position shown for the preceding point, i. e., when point II moves to the position shown for point I, point III moves to the position shown for point II, etc. When the entire device is in the position shown in the drawing, the motor is started in the usual manner by applying the source 14 to the field winding 11 in the usual manner. A power circuit is completed from the direct current source 14 through the secondary winding of the transformer 22, over the slip ring 18, the valve 36, to point I of the armature winding, through the winding 13 in both directions to point III through valve 38' to slip ring 16, through the secondary winding of transformer 21, through the field windings 12 and 11, and back to the direct current line 14. The grids of the valves 36 and 38' have impressed thereon a positive bias from the battery 32 through the commutator segment 26 and brush 28 in contact therewith in the position shown in the drawing. All of the other valve grids are given a negative bias from the battery 34 through the resistance 33, the commutator segment 27 and the brushes resting thereon, thereby preventing the flow of current to the several negatively biased valves.

When the armature has rotated in a clockwise direction during the next moment of operation, point II will have been brought midway between its location as shown in the drawing and that shown in the drawing for point I, and the brushes 28 and 29 will have been so rotated on the commutator 26, 27 as to be both in contact with the segment 26. A power circuit is then completed from the direct current supply line 14 to the secondary winding of the transformer 22 over slip rings 18 and 19, through valves 36 and 37, to the armature winding connection points I and II, through the winding 13 to the points III and IV, through the valve 38' and 39'.to the slip rings 16 and 17, through the secondary winding of the transformer 21, through the fields 12 and 11, and back to the direct current line 14. The grids of the valves 36, 37, 38' and 39' accordingly have impressed thereon a positive bias from the battery 32 through the commutator segment 26 and the brushes 28 and 29 contacting therewith. All of the other valve grids are negative as above described.

During the next moment of rotation of the armature and of the brushes, point II will have been brought to the position shown in the drawing for point I and brush 28 will have rotated sufficiently to contact with commutator segment 27 on which a negative bias is impressed from the battery 34. A circuit is then completed from the direct current supply line 14 through the secondary winding of the transformer 22, through the slip ring 19, the valve 37 to point II, through the winding 13 in both directions to the point IV thereof, through the valve 39' over the slip ring 17, through the secondary winding of the transformer 21, through fields 12 and 11, and back to the direct current line 14. The grids of the valves 37 and 39' accordingly have a positive bias impressed thereon, and all of the other valve grids are negative as respects their cathodes, as above described.

It will be seen that, in the first portion of the cycle considered, the grids of the valves 36 and 38' are positive and that the grids of the valves 37 and 39 are negative; while in the third position, above described, the grids of the valves 37 and 39 become positive, while the grids of the valves 36 and 38 become negative, but the current continues to flow through the valves 36 and 38' until the voltages induced in the secondary winding of the transformers 21 and 22, by the alternator 23, balances the difference of counter-electromotive force produced in the two circuits by the armature winding 13. Once interrupted, the current in the first circuit cannot pick up again until the grids of the valves 37 and 38′ are again positive.

Figure 2:
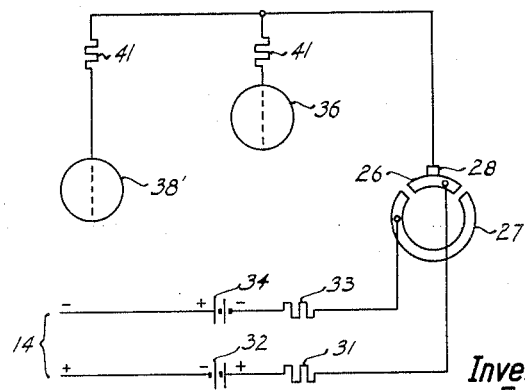

The circuit above described for the first step of the cycle of operation for the control of the grids of the valves 36 and 38 may be clearly seen by reference to Fig. 2 in which such portions of the device are shown as entered into the control circuit.

Figure 3:
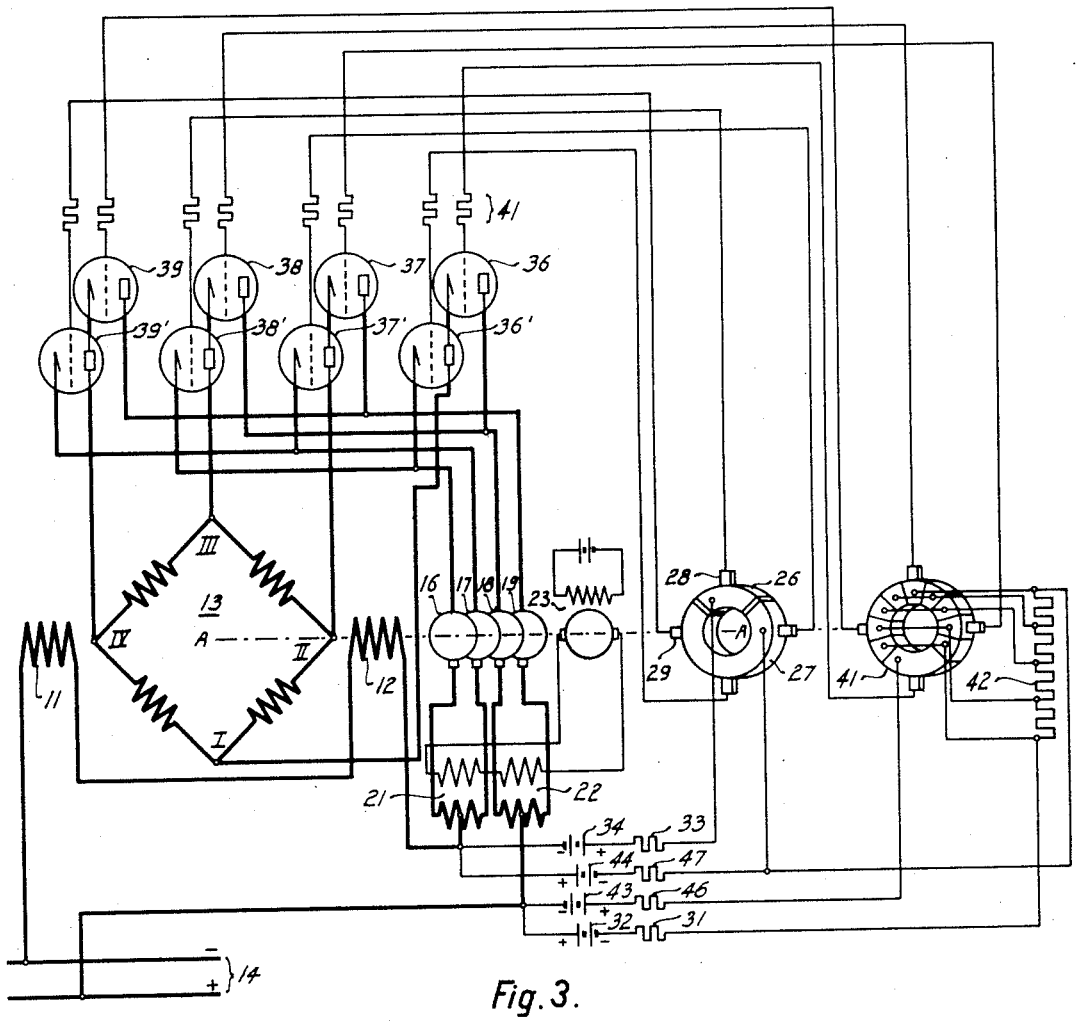
Figure 4:
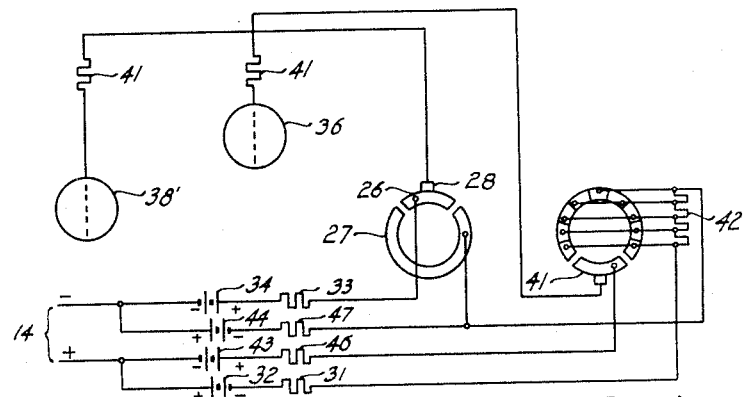
Fig. 4 is a diagram showing those portions of Fig. 2 necessary to illustrate the valve grid control circuit energized during at least one portion of the cycle of operations.

In the embodiment shown in Fig. 3, the power circuit (shown in heavy lines through the drawing) is exactly like that shown in Fig. 1 and, accordingly, does not require further description. The control circuits for the valves are, however, changed by the addition of an auxiliary commutator 41 having resistances 42 connected to the several segments thereof in potentiometer connection. The commutator 41 is supplied with current from the batteries 43, 44 and 32, through the resistances 46, 47 and 31. The potentiometer commutator brushes are connected with the grids of one valve of each pair and make such grids more positive or more negative with respect to the plus or minus poles of the direct source, with the advantage that full line voltage is no longer applied to adjacent segments of a commutator.

The control circuit having been amplified over those shown in Fig. 1, the control circuits to the several valve grids will naturally be somewhat changed. The cycle of operations with respect to Fig. 1 takes place in this modification, as well as in all those to be hereinafter described and, for purposes of uniformity, the control circuits produced at the same moments of rotation of the armature will be described hereinafter. Again considering the moment of operation, during which point I is in the position shown in the drawing, a circuit will be completed from the direct current source 14 over the secondary winding of the transformer 22, the slip ring 18, the valve 36, point I of the armature winding, through both portions of the armature winding, through to the point III, through valve 38′ over slip ring 16, through the secondary winding of the transformer 21, through the fields 12 and 11 to the source 14. The grid of the valve 36 is given a positive bias from the battery 43 through the resistance 46 and over the commutator 41. The grid of the valve 38′ is given a positive bias from the battery 34 through the resistance 33 over the commutator segment 26 and the brush 28 resting thereon. The grids of all other valves are maintained at a negative bias with respect to their respective cathodes because of being supplied with current from the batteries 32 and 44.

During the second moment of operation, i. e., when point I has been brought midway between its position, as shown, and the position shown for point I in the drawing, the power circuit will again be the same as described for the same moment with relation to Fig. 1, but the control circuit for the grids of the valves will be different, as will not be described. The grid control circuits for the valves 36, 37 and 38′, 39′ are different from those above described in that the grids of the valves 36 and 37 are given a positive bias from the battery 43 over the resistance 46 and the commutator 41, and the grids of valves 38′ and 39′ are given a positive bias from the battery 34 over the commutator segment 26. The grids of all the other valves are negative, being supplied with current from the batteries 32 and 44.

During the third and last moment of the given cycle of operation, i. e., when point II has been rotated to the position shown in the drawing for point I, the power circuit will be again as above described with respect to Fig. 1, and the grid control circuit will be varied in that the grid of the valve 37 is given a positive bias from the battery 43, through the resistance 46, and over the commutator 41 and the grid of the valve 38′ is given a positive bias from the battery 34 through the resistance 33 and over the commutator segment 26. The grids of all the other valves are impressed with a negative bias through being supplied with current from the batteries 32 and 44. It will be seen that the grids of the inlet valves of each pair are made positive with respect to the plus bus-bar of the line 14 by means of battery 43 and are made negative with respect to the minus bus-bar by battery 44 which negative bias is increased by a battery 32 and potentiometer commutator 41 and 42; while the grids of the outlet valves are made positive with respect to the plus bus bar and negative with respect to the minus bus-bar of the current source 14 by battery 34, which negative bias is increased by the battery 42.

A diagram illustrating the grid control circuits, similar to that shown in Fig. 2 and relating to Fig. 1, is shown with respect to Fig. 3. In the present embodiment, current is not present in the resistances 41 through the entire time when the grids are negative as was the case heretofore.

The power circuit again being the same in Fig. 5, as that described for Fig. 1, only the changed grid control circuits will be described for the three stages of the cycle of operation carried out during the rotation of the armature which brings point II to the position shown occupied by point I.

During the first step of the cycle, i. e., when points I and II are in the position shown and the motor is being started, the grid of the valve 36 has impressed thereon a positive bias from the battery 32 over the slip ring 52, and the grid of the valve 38′, has a positive bias impressed thereon from the battery 48 over the slip ring 51.

The grids of all of the other valves have a negative bias, impressed thereon from the battery 34 over the commutator segment 27 and the brushes resting thereon. When point II has moved midway to the position shown from point I, the grids of the valves 36 and 37 are made positive from the battery 32 over the slip ring 52, the grids of the valves 38' and 39' are made positive from the battery 48 over the slip ring 51 and the grids of all of the other valves have a negative bias impressed thereon from the battery 34 over the commutator segment 27 and the brushes resting thereon. When point II occupies the position shown for point I, the grid of the valve 37 has a positive bias impressed thereon from the battery 32 over the slip ring 52, the grid of the valve 39' has a positive bias impressed thereon from the battery 48 over the slip ring 51 and the grids of all of the other valves have a negative bias impressed thereon from the battery 34 over the commutator segment 27 and the brushes in contact therewith. It will thus be seen that the grids of the inlet valves are made positive with respect to the positive bus-bar of the source 14 by means of current supplied from the battery 32 over the slip ring 52 and are made negative with respect to the negative bus-bar and, therefore, also with respect to the positive bus-bar, by means of current supplied from the battery 34 over the commutator 26, 27. The grids of the outlet valves are made positive with respect to the negative bus-bar of the source 14 from the battery 48, and are made negative with respect to the negative bus-bar from the battery 34 over the commutator 26, 27.

Figure 5:
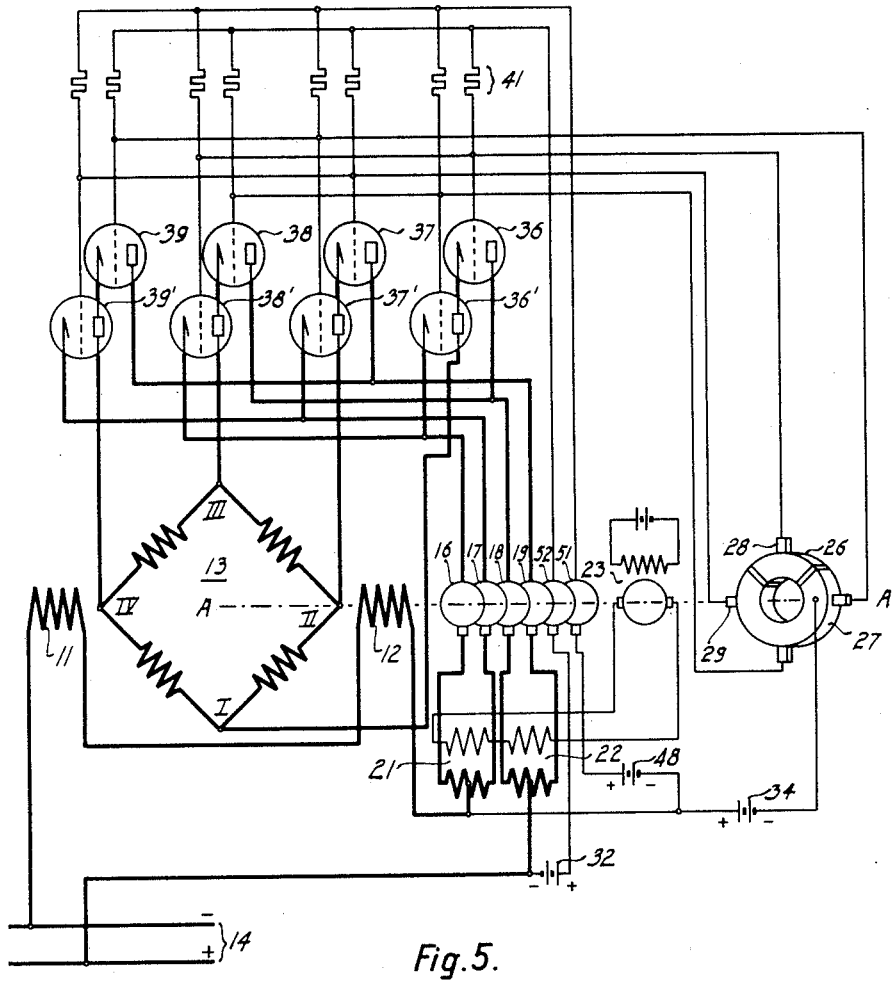
Fig. 5 illustrates a modification of the invention differing from the embodiment shown in Fig. 1, in that the valves are periodically connected to opposite poles of the source of current over slip rings.
Figure 6:
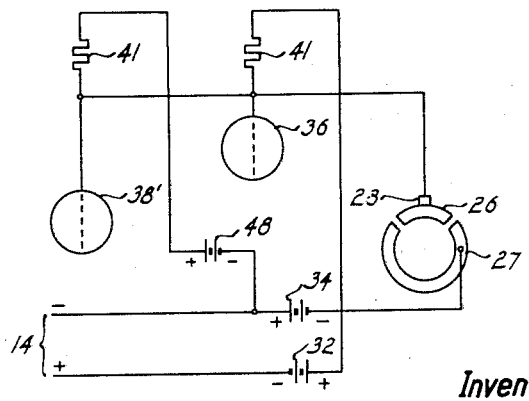
Fig. 6 is a diagram showing the control circuit for the grids of the valves in the embodiment shown in Fig. 5.

Fig. 6 is a diagram illustrating the grid control circuit for the valves 36 and 38' as such circuit is energized during the first portion of the cycle of operation as it relates to the embodiment shown in Fig. 5.

Figure 7:
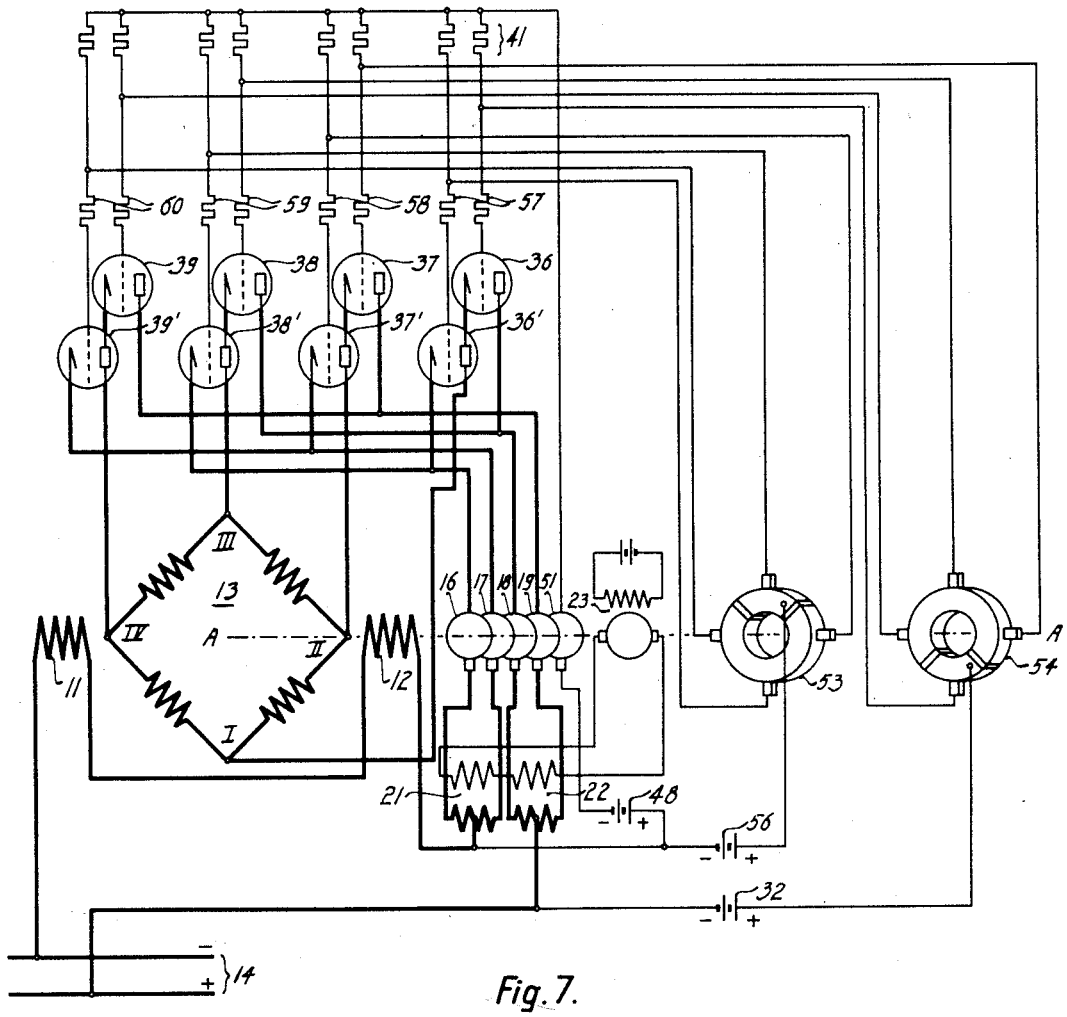
Fig. 7 is a further modified diagrammatic illustration of the invention, differing from that shown in Fig. 5 by connections of such character that the resistances connecting the valves to the source of current are carrying current only when the grids of the valves are positive.

In the embodiment shown in Fig. 7, the following changes in structure from that shown in Figs. 1 and 3 are to be noted, namely, the substitution of the commutators 53 and 54 for the commutator 26, 27, and substitution of the battery 56 for the battery 34 and the insertion of resistances designated as 57, 58, 59 and 60, connected into the circuits of the valve grids, as shown. The power circuit in the present embodiment being the same as above described, need accordingly not be repeated. The difference in arrangement of the valve grid control system produces a difference in the control circuits which will now be described with respect to the three-stage cycle of operations above described.

In the first stage of the cycle, a circuit is completed whereby the grid of valve 36 has a positive bias impressed thereon from the battery 32 over the commutator 54 and the brushes resting thereon through the resistance 57. The grid of the valve 38' has a positive bias impressed thereon by current flowing from the battery 56 over the commutator 53 and through the resistance 59, and the grids of all other valves are supplied with a negative bias from the battery 48 over the slip ring 51 and through the resistances 41, etc. The second stage of the cycle of operations completes a circuit in which the grids of the valves 36 and 37 have a positive bias impressed thereon from the battery 32 over the commutator 54 and through the resistances 57 and 58; the grids of the valves 38' and 39' have a positive bias impressed thereon from the battery 56 over the commutator 53 and through the resistance 59 and 60, and all other valve grids have a negative bias impressed thereon in the same manner as above described with respect to the grid control circuits for the first stage of the cycle of operation. In the third and last stage of the cycle of operation, a positive bias is impressed on the grid of the valve 37 from the battery 32 over the commutator 54 and through the resistance 58 and the valve 39' has a positive bias impressed on the grid thereof from the battery 56 over the commutator 53 and through the resistance 60. All of the other valve grids have a negative bias impressed thereon, as immediately above described with respect to the first stage of the cycle of operations.

In the present embodiment, the grids of the inlet valves are made positive with respect to the positive bus-bar by means of the battery 32, the commutator 54 and the resistance 51, and are made negative with respect to the negative bus-bar and, therefore, with respect to the positive bus-bar of the source 14 by means of current from the battery 48 over the slip rings 51, the resistances 41 and the resistance 57. The grids of the outlet valves are made positive with respect to the positive bus-bar and, therefore, with respect to the negative bus-bar, by means of current flowing from the battery 56 over the commutator 53 through the resistance 59 and are made negative with respect to the negative bus-bar by current flowing from the battery 48 over the slip ring 51, the resistances 41 and the resistance 59. It will be seen that current is present in the resistances 41 in this embodiment only when the grids of the valves are positive and, therefore, for a much shorter period of time than was the case with respect to the earlier embodiment herein described.

Figure 8:
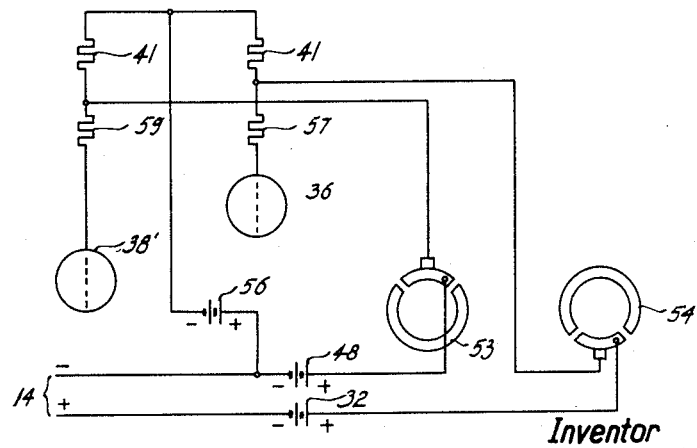
Fig. 8 is a diagrammatic showing of the control circuits for the grids of the valves shown in the embodiment in Fig. 7.

Figure 8 is a diagram illustrating the grid control circuit for the valves 36 and 38' as such circuit is energized during the first portion of the cycle of operations as it relates to the embodiment shown in Fig. 7.

Figure 9:
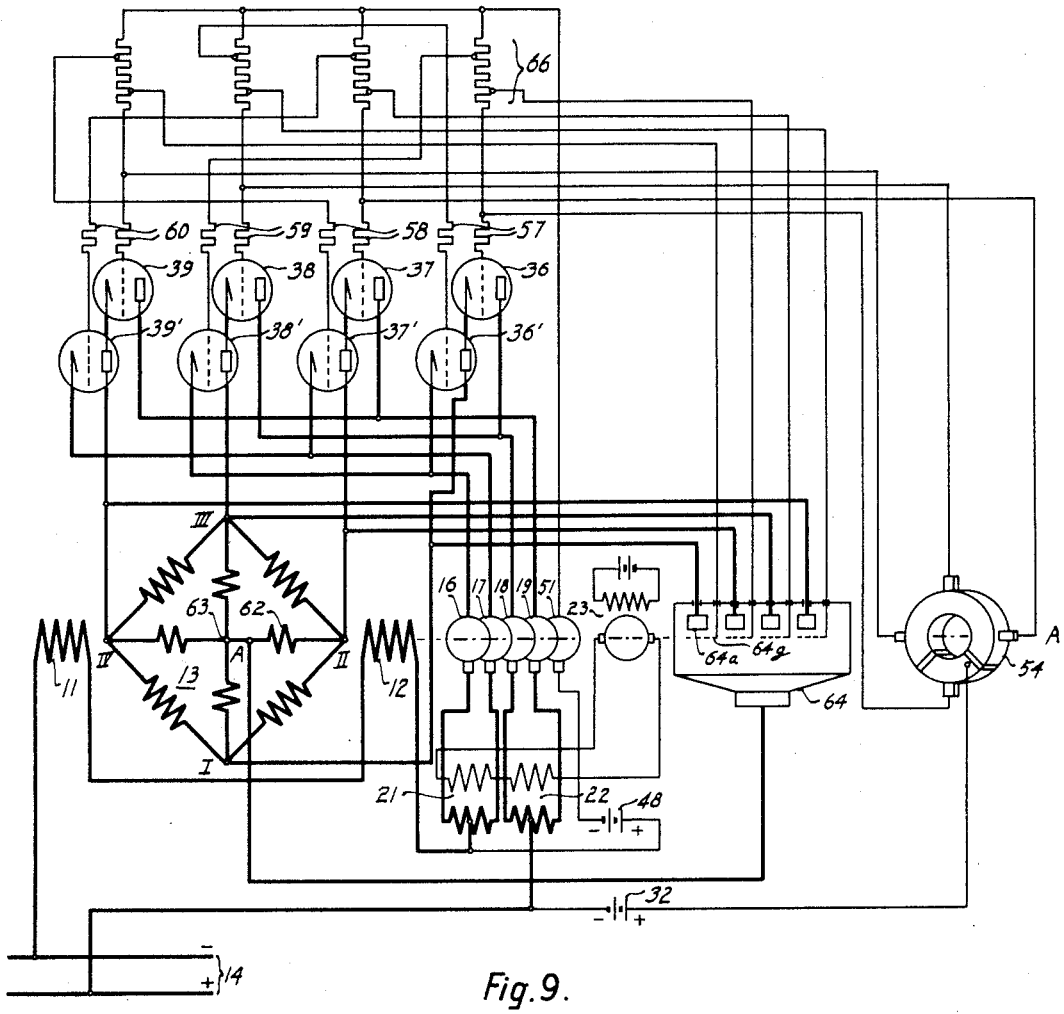
Fig. 9 is a diagrammatic showing of the embodiment of the invention in which a metallic vapor electric current rectifier is used for maintaining the neutral line of the armature winding in a fixed position independently of the armature current, thereby preventing a shift of the neutral line proportionately to the current strength, whereby the characteristics of the motor would be modified.

Figure 9 illustrates a modification of the invention applicable to any of the preceding embodiments of the invention in which figure a means is shown whereby the neutral line of the armature 13 may be maintained in a fixed position independently of the armature current or in which the neutral line of the armature may be shifted proportionately to the current strength to modify the characteristics of the motor.

The arrangement shown differs from that heretofore shown and described in that the points of connection of the armature windings are connected by windings as at 62 forming a common neutral point 63 to which is connected the cathode of an electric current rectifier 64. The anodes 64a of the rectifier are connected with the connection points of the several armature winding portions, and the grids 64g of the rectifier are connected to the resistance 66 arranged between the inlet and outlet valve grids, in such manner that the valve grids are positive with respect to the neutral points once per revolution of the armature.

The difference in the structure above set forth from that heretofore shown and described, produces a power circuit in which the grid of valve 36 has a positive bias impressed thereon through the resistances 66, the grid 64g of the rectifier then becoming positive, and an equalizing current flows into the armature winding at the point II from the anode 64a of the rectifier 64, and the current flows from the connection point II to the neutral point 63 and through the winding 62, whereby the connection point II is maintained at the voltage of the neutral point 63.

The grid control circuits which produce the commutating action again change their condition similarly throughout a triple stage cycle of operations in the first of which a positive bias is impressed on the grid of the valve 36 from the battery 32 over the commutator 54 and through the resistance 57; a positive bias is likewise impressed on the grid of the valve 38' from the battery 32 over the commutator 54 through the resistance 66 and through the resistance 59 and the grids of all of the other valves have a negative bias impressed thereon from the battery 48 over the slip ring 51 and through the resistances 66. In the second stage of the cycle of operations, a positive bias is impressed on the grids of the valves 36 and 37 from the battery 32 over the commutator 54 and through the resistances 57 and 58 and a positive bias is impressed on the grids of the valves 38 and 39 from the battery 32 over the commutator 54 and through the resistances 57 and 58.

A positive bias is impressed on the grids of the valves 38 and 39 from the battery 32 over the commutator 54 through the resistances 66 and through the resistances 59 and 60, while the grids of all of the other valves remain negative as described immediately above. The third and last step in the cycle of operation, the grids of the valve 38' have a positive bias impressed thereon from the battery 32 over the commutator 54 and the resistance 58, and the grid of the valve 39' has a positive bias impressed thereon from the battery 32 over the commutator 54, through the resistances 66 and the resistance 60, and all of the valve grids remaining have a negative bias impressed thereon, as described immediately above. It will thus be seen that the grids of the inlet valves in the present embodiment are made positive with respect to the positive bus-bar by means of current from the battery 32 taken over the commutator 54 and through the resistance 51, and are made negative with respect to the negative bus-bar and, therefore, with respect to the positive bus-bar, by means of current taken from the battery 48 over the slip ring 51 and through the resistances 56 and 57. The grids of the outlet valves are made positive with respect to the positive bus-bar from the battery 32 over the commutator 54 and through the resistances 66 and 69 and are made negative with respect to the negative bus-bar by current taken from the battery 48 over the slip ring 51 and the resistances 66 and 69. In the present embodiment, therefore, current is present in the resistances 66 only when the grids of the operating valves are positive.

Figure 10:
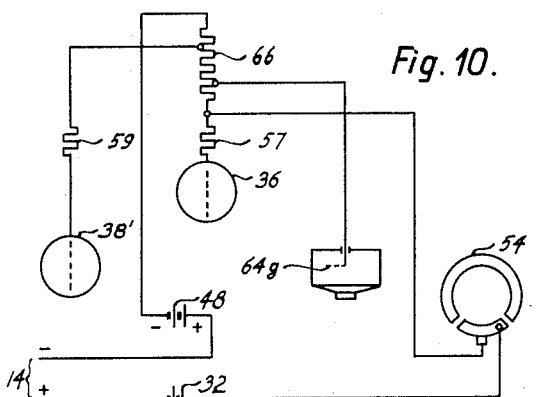
Fig. 10 is a diagrammatic illustration of the grid control circuits for the embodiment of the invention shown in Fig. 9.

Figure 10 is a diagram illustrating the grid control circuit for the valves 36 and 38', as such circuit is energized during the first portion of the cycle of operations as it relates to the embodiment shown in Fig. 9.

Figure 11:
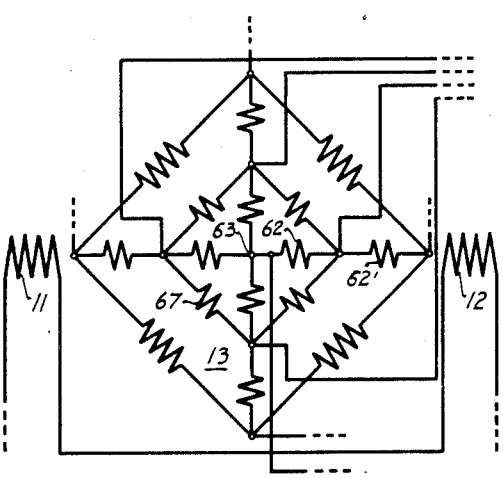
Fig. 11 illustrates a modification of the embodiment of the invention shown in Fig. 9, in which modification inductive auxiliary windings interconnect portions of the main winding to permit the application of low voltage to the electric current rectifier instead of high voltage from the main windings only.

Figure 11 presents a modified form of the armature winding arrangement shown in Fig. 9, which permits the application of low voltages to the rectifier 64 instead of the high voltages from the main armature winding portions, as shown in Fig. 9. It will be seen that the point II is connected with the neutral point 63 of the armature winding 13 by means of inductively related windings 62 and 62' having an inductively related auxiliary winding 67 connected therebetween. The anodes 64a of the rectifier are then connected with the ends of the auxiliary winding 67. It will be understood, of course, that the modified form of armature winding shown in Fig. 11 may be substituted for that shown in Fig. 9 without any other changes therein.

Although but a few embodiments of the present invention have been illustrated and described, it will be apparent to those skilled in the art that various changes and modifications may be made therein without departing from the spirit of the invention, or from the scope of the appended claims.

The invention claimed is:

1. In a direct current commutating device for polyphase motors, a polyphase winding divided into a plurality of winding portions, metallic vapor valves connected between the winding portions, a source of direct current connected with said valves, a source of alternating current, and means for superimposing the alternating current on the direct current.

2. In a direct current commutating device for polyphase motors, a polyphase winding divided into a plurality of winding portions, metallic vapor valves connected between the winding portions, a source of direct current connected with said valves, a source of alternating current of higher frequency than the fundamental harmonic of the current produced in said winding, and means for superimposing the alternating current on the direct current thereby causing a periodic passage through zero of the winding current.

3. In a direct current commutating device for polyphase motors, a polyphase winding divided into a plurality of winding portions, grid-controlled electric valves connected between the winding portions, a source of direct current connected with the said valves, a source of alternating current, sources of current applicable to impress a bias on the grids of said valves, a commutator for alternately connecting the grids of diametrically opposed valves to said sources of grid control current, and means for superimposing the alternating current on the direct current.

4. In a direct current commutating device for polyphase motors, a polyphase winding divided into a plurality of winding portions, electric valves connected between the winding portions, a source of direct current connected with the said valves, an alternator, transformers connected with said alternator, a plurality of slip rings connected with said valves and with the secondary windings of said transformers, said source of direct current being connected with the secondary winding of said transformers, and means for alternately impressing a bias on the grids of the said valves.

5. In a direct current commutating device for polyphase motors, a polyphase winding divided into a plurality of winding portions, grid-controlled vapor valves connected between the winding portion, a source of direct current connected with said valves, an alternator, transformers connected with said alternator, the primary winding of said transformers being connected in series, a plurality of slip rings connected with said valves and with the secondary windings of the said transformers, said source of direct current being connected with the secondary windings of said transformers, sources of grid-control current, and means for simultaneously impressing a different bias on the grids of alternative pairs of said valves.

In testimony whereof I have signed my name to this specification.

ERWIN KERN.